Feb. 19, 1952  C. E. BARKIS  2,586,414
TROLLEY FOR ELECTRIC POWER DISTRIBUTION SYSTEM
Original Filed Aug. 14, 1946  2 SHEETS—SHEET 1

INVENTOR
CHARLES E. BARKIS
BY
ATTORNEY

Feb. 19, 1952     C. E. BARKIS     2,586,414
TROLLEY FOR ELECTRIC POWER DISTRIBUTION SYSTEM
Original Filed Aug. 14, 1946     2 SHEETS—SHEET 2

INVENTOR
CHARLES E. BARKIS
BY
ATTORNEY

Patented Feb. 19, 1952

2,586,414

UNITED STATES PATENT OFFICE 2,586,414

TROLLEY FOR ELECTRIC POWER DISTRIBUTION SYSTEM

Charles E. Barkis, San Francisco, Calif., assignor, by mesne assignments, to General Electric Company, a corporation of New York Original application August 14, 1946, Serial No. 690,581, now Patent No. 2,568,480, dated September 18, 1951. Divided and this application March 15, 1949, Serial No. 81,452

3 Claims. (Cl. 191—45)

My invention relates to overhead bus bar duct trolley systems especially those intended for installation in positions exposed to the action of the weather.

An object of the system is to provide apparatus which is capable of withstanding exposure to rain and dust as for instance in shipyards and other outdoor locations.

The main object of the present invention is to provide a trolley type of branch take-off which is effective. This application is a division of my copending application filed August 14, 1946, Serial Number 690,581, now Patent No. 2,568,480 dated September 18, 1951.

Another object is to provide apparatus which can be readily inspected, adjusted and repaired.

For this purpose, I provide a duct which encloses the bus bars and the tracks which support trolley-like collectors carrying the brushes for engaging the bus bars and to which the branch conductors are attached. The collectors are specially constructed so as to facilitate installation, inspection and replacement.

The accompanying drawings and the following specification show and describe a preferred construction embodying the invention.

Figure 1:
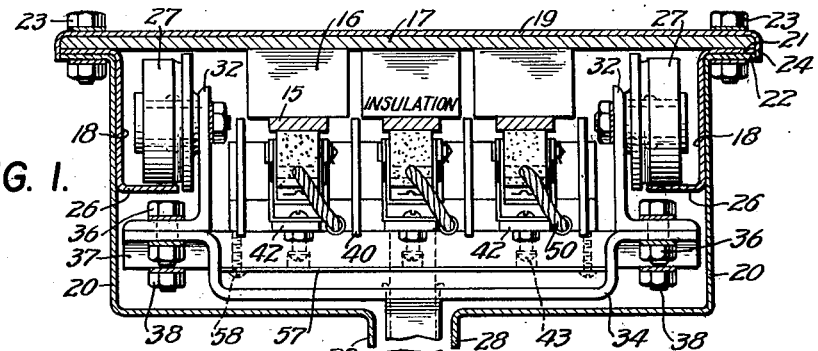
Fig. 1 is a cross-sectional view showing a bus bar duct and a trolley take-off or collector embodying the invention in position.

The bus bars 15, 15, 15 may be of any suitable construction and each is mounted on an insulating block 16 carried by a cross bar 17. These insulating blocks and cross bars are arranged at intervals along the length of the bus bars and are enclosed in the duct. The duct itself consists of side bars 18, 18 of Z-shaped section, a top plate 19 and flanged side covers 20, 20. The upper flange 21 of each Z-bar and the flange 22 of each side cover are secured together and to the cross bars 17 by bolts 23, 23. The edges of the top plate 19 may be flanged over at 24 to cover the ends of the cross bars and the edges of the flanges mentioned. As the duct will naturally be longer than any one of the top plate sections, transverse splice bars to connect the ends of adjacent sections of the top plates may be provided as shown in my copending application.

The Z-bars 18, 18 are made sufficiently strong so that their lower flanges 26, 26 may serve as tracks for the rollers or wheels 27, 27 of the collector or trolley take-off device. The side covers 20, 20 need not be as heavy or strong as the Z-bars but they do extend horizontally to form the bottom of the duct and are provided with spaced-apart flanges 28, 28 which thus provide a slot for the passage of the branch conductors 29 and the guard 29'. The side covers 20 are formed in suitable lengths and at the locations where the joints in the bus bars occur I provide short cover sections which are removable to facilitate access to the connection between the bus bars and to facilitate insertion and removal of the trolley collector as shown in my copending application.

The trolley take-off or collecting device has angle bar sides 32, 32 constituting part of its frame and which are connected by transverse members 33 and 34. Transverse member 33 is detachably secured to the horizontal flanges of the opposite angle bars 32, 32 by bolts 35, 35 and member 34 is secured by pairs of bolts 36, 36. The conductor guard 29' is secured to the transverse member 34 and extends through the slot between the flanges 28, 28 of the cover members.

An insulating cross bar 37 is secured to the horizontal flanges of the angle bars by bolts 38, 38 and supports the brushes 39, 39, 39 which engage the under surface of the bus bars 15, 15, 15. Insulating barriers such as 40, 40 are mounted in slots 41, 41 in the bar 37 alongside of and between the brushes and their supports. Conductor bars or strips 42, 42 are secured by bolts 43 to the insulating cross bar 37 and on these bars are mounted the saddles 44, 44 which carry the brush holders 45, 45. The brush holders are arranged in pairs, each pair being hinged and supported by a pivot 46 and biased upwardly by a spring 47 to press the brushes against the bus bars. To limit the movement of each brush holder when the trolley collector is removed from the duct, I provide a headed stud 48 which is secured to the base of the saddle 44 and the brush holder is provided with a keyhole-shaped opening 49 to facilitate assembly and disassembly. Each brush 39 has a flexible lead 50 and a terminal piece 51 which is secured to the conductor bar 42 on which the brush is mounted.

On the end of each conductor bar 42 is detachably mounted an attachment lug 52 of suitable form to which one of the conductors 29 is secured.

In order to hold the conductors in position adjacent the attachment lugs I provide clamping members 54 and 55 held together and secured to the transverse member 34 by bolts 56, 56'.

I also provide an insulating guard plate 57 which is removably secured to the cross bar 37 by screws 58.

From the foregoing it will be seen that the strain applied to the trolley collector when the conductors are pulled is taken up by the clamp on the transverse member 34 and not by the conductor bars 42. The brushes being mounted between the trolley rollers and being spring pressed are maintained in perfect contact with the bus bars.

The side bars 32, 32 with the rollers 27, and the transverse members 33 and 34 constitute the frame unit of the collector. The insulating cross bar 37 with the attached conductor strips 42, 42, 42 and the brush holders and brushes constitute the brush assembly unit which is detachably carried by the collector frame.

Access may be had to a trolley collector by removing a short cover section, whereupon, if desired, the guard plate 57 may be removed.

By this construction, it is possible when the short side covers are removed to remove the entire brush assembly as a unit from the collector frame. For this purpose, the conductor lugs 52, 52 are detached from the conductor bars 42 and the bolts 38, 38 removed so as to disconnect the cross bar 37 and the attached brushes from the side bars 32, 32.

Figure 2:
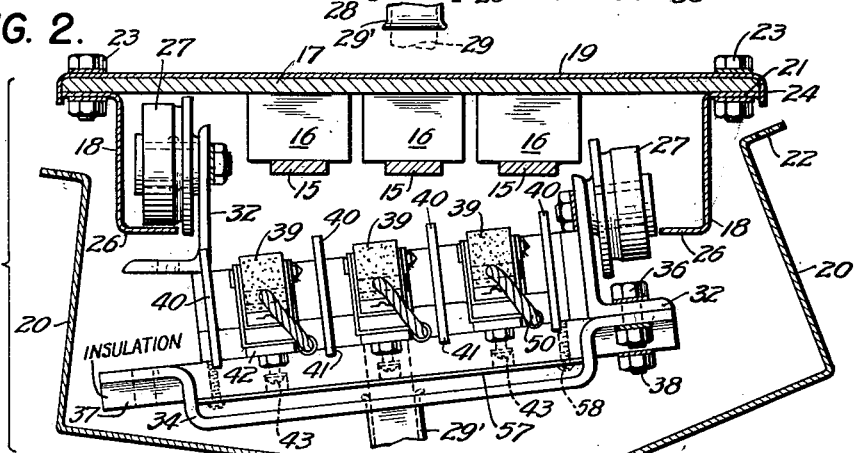
Fig. 2 is a similar view showing the trolley collector in the position of insertion into or removal from the duct.
Figure 3:
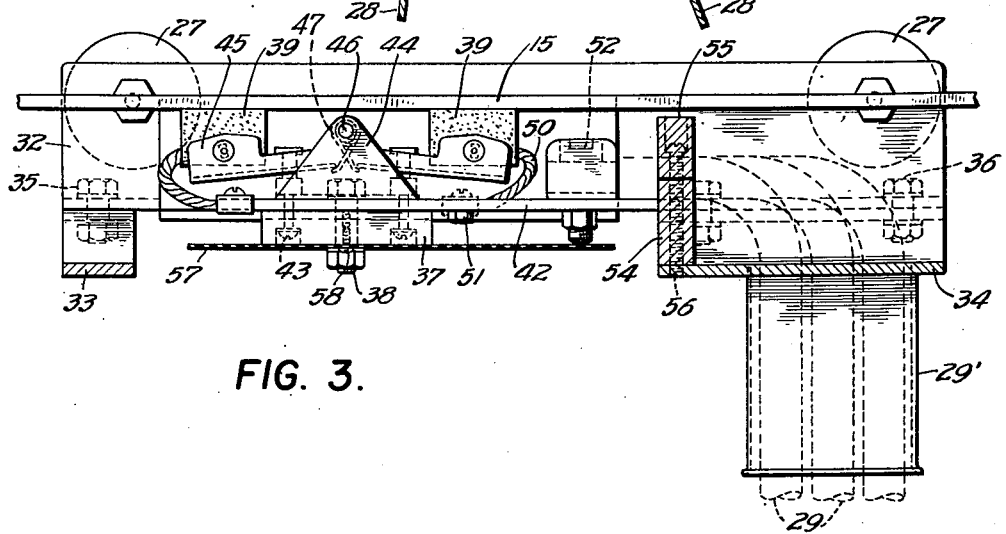
Fig. 3 is a side view and section of the trolley take-off or collector device.
Figure 4:
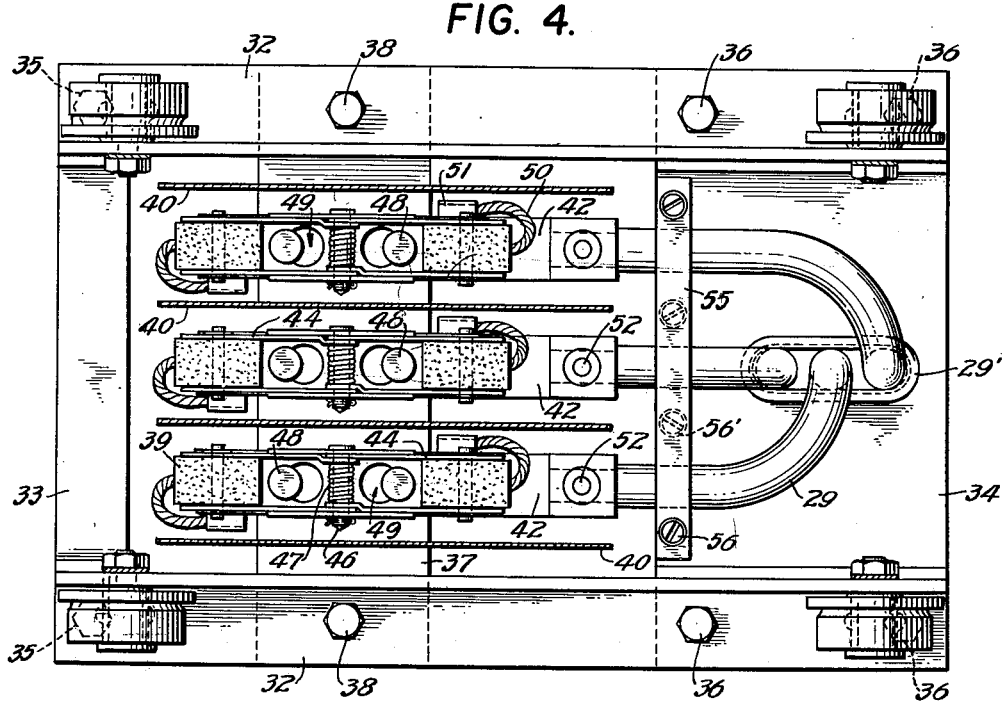
Fig. 4 is a plan view of the trolley take-off or collector device.
Figure 5:
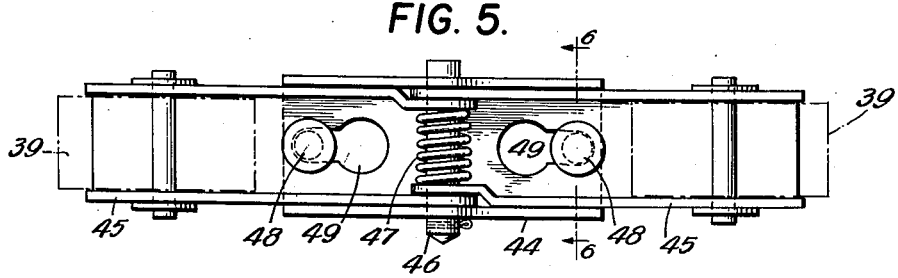
Fig. 5 is a plan view of a brush holder.
Figure 6:
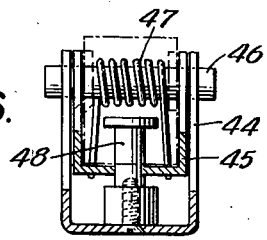
Fig. 6 is a cross-sectional view of a brush holder on the plane of the line 6—6 of Fig. 5.

If it is desired to inspect or repair the brushes or other parts of the collector, it is a simple matter to remove the entire collector. For this purpose, the bolts 35, 36 and 38 along one side of the collector which secure the transverse bars 33, 34 and 37 of the collector to the adjacent angle bar 32 are removed and the remainder of the collector tilted as shown in Fig. 2 whereupon it may be removed. If necessary, the angle bar at the left in Fig. 2 when thus detached may be moved longitudinally along the track 26 to provide more clearance.

From the foregoing, it will be seen that according to this invention, a trolley can be removed from the duct and the bus bars without disturbing the bus bars or trolley tracks by simply removing a short cover section 20 of the duct and disconnecting the cross bars 33 and 34 from the angle bar 32 at one side as shown in Fig. 2.

The construction will thus be seen to be simple, rugged and protected to a maximum degree from interference or damage and yet capable of convenient inspection and repair.

I claim:

1. A trolley collector for a power distribution system comprising an insulating transverse supporting means, angle pieces having outwardly extending feet detachably secured along the opposite side edges thereof, supporting rollers carried by the opposite ends of the upright flanges of said angle pieces, conductor bars carried by said supporting means between said angle pieces, contact brushes resiliently mounted on said conductor bars and distribution conductors connected to the ends of the conductor bars.

2. A trolley collector for a power distribution system comprising side bars having outwardly extending flanges, transverse connectors detachably connecting the ends of said side bars, insulating supporting means supported by the flanges of said side bars between said end connectors, supporting rollers carried by the opposite ends of the side bars, conductor bars carried by said supporting means between said side bars, contact brushes resiliently mounted on said conductor bars and distribution conductors connected to the ends of the conductor bars.

3. A trolley collector comprising a frame having oppositely disposed parallel side bars, each bar having a vertical and a horizontal flange, the horizontal flanges extending outwardly in opposite directions, cross bars detachably bolted to the opposite horizontal flanges, supporting rollers secured to the opposite sides of the vertical flanges of the side bars, conductor bars secured to one of said cross bars between said side bars, contact members supported by said conductor bars, and flexible distribution conductors connecting the ends of said contact members and said conductor bars.

CHARLES E. BARKIS.

REFERENCES CITED

The following references are of record in the file of this patent:

UNITED STATES PATENTS

| Number | Name | Date |
|---|---|---|
| Re. 19,513 | Frank et al. | Apr. 2, 1935 |
| 1,192,268 | Borchard | July 25, 1916 |
| 2,210,171 | Horn | Aug. 6, 1940 |
| 2,245,135 | Martin | June 10, 1941 |